United States Patent
Triantos (10) Patent No.: US 8,065,833 B2
(45) Date of Patent: Nov. 29, 2011

(54) GROTUBE

(76) Inventor: Philip A. Triantos, Roselle, IL (US)

( * ) Notice: Subject to any disclaimer, the term of this patent is extended or adjusted under 35 U.S.C. 154(b) by 343 days.

(21) Appl. No.: 11/487,249

(22) Filed: Jul. 14, 2006

(65) Prior Publication Data

US 2007/0011944 A1   Jan. 18, 2007

Related U.S. Application Data (60) Provisional application No. 60/699,885, filed on Jul. 16, 2005.

(51) Int. Cl.
*A01G 31/02* (2006.01)
(52) U.S. Cl. .......................................... 47/62 R
(58) Field of Classification Search .................. 47/59 R, 47/60, 62 R, 62 C, 62 E, 62 N, 63, 64
See application file for complete search history.

(56) References Cited

U.S. PATENT DOCUMENTS

| | | | | |
|---|---|---|---|---|
| 4,255,896 A | * | 3/1981 | Carl | 47/62 C |
| 4,324,069 A | * | 4/1982 | Flagg | 47/62 E |
| 4,630,394 A | * | 12/1986 | Sherard | 47/59 R |
| 4,669,217 A | * | 6/1987 | Fraze | 47/64 |
| 5,054,233 A | * | 10/1991 | Evans | 47/62 R |
| 5,067,275 A | * | 11/1991 | Constance | 47/62 E |
| 5,097,627 A | * | 3/1992 | Roberts | 47/65 |
| 5,394,647 A | * | 3/1995 | Blackford, Jr. | 47/62 A |
| 5,557,884 A | * | 9/1996 | Deppe | 47/62 E |
| 5,860,247 A | * | 1/1999 | Newby | 47/59 R |
| 6,058,650 A | * | 5/2000 | Chen | 47/62 R |
| 6,219,966 B1 | * | 4/2001 | Lapointe et al. | 47/62 C |
| 6,247,268 B1 | * | 6/2001 | Auer | 47/62 R |
| 2006/0218860 A1 | * | 10/2006 | DeFrancesco | 47/62 R |

FOREIGN PATENT DOCUMENTS

JP          63279725 A  * 11/1988
WO     WO 8601976 A1  *  4/1986

* cited by examiner

*Primary Examiner* — Son T Nguyen
(74) *Attorney, Agent, or Firm* — Michael Ries

(57) ABSTRACT

The present invention is a hydroponics system with a grotube for drip and ebb and flow methods of plant nourishment. The present invention includes at least one main body with at least one port or grow station. Nutrient fluid is circulated from a reservoir via a pump into the main body through an inlet pipe. The inlet pipe is placed above or below a plant root ball. The fluid then exits the main body via a drain pipe and then returns to the reservoir. The height of the pipe determines the level of nutrient fluid. Plants are grown in removable strainers, contacting the nutrient fluid, with little or no solid growth medium. A removable plate atop the saddle reduces moisture loss from the main body, and inhibits rainfall from entering the main body when used outdoors.

19 Claims, 6 Drawing Sheets

GROTUBE

This application claims the benefit of U.S. Provisional Patent Application Ser. No. 60/699,885, filed Jul. 16, 2005.

TECHNICAL FIELD & BACKGROUND

The present invention generally relates to the field of hydroponics growing of plants that are root-nurtured, primarily without soil by a flowing liquid medium containing nutrients. More specifically, the present invention relates to hydroponics growing that has better water height control and protection against rainwater intrusion. Further, the present invention requires less solid growing media than other systems. The present invention also enables the sprouting of plant seeds, cuttings and the nurturing of seedlings. The modular design of the present invention allows configuration of the device in many arrangements improving the flexibility of the system to meet customer needs.

Other devices lose more water from the hydroponics medium to the surrounding indoor environment raising ambient humidity and changing the concentration of nutrients in the hydroponics medium; conversely, for outdoor growers, rainfall adversely affects the hydroponics medium by collecting in such other systems and diluting the medium. This requires medium and pH adjustment after each rainfall. Other hydroponics systems also require solid growing media or larger amounts of solid growing media, such as ALLIFLOR, HYDROTON and ROCKWOOL or others or a growing block that collect salts from various fertilizers and cause a pH imbalance at the root ball; these solid media also constitute an environmental disposal hazard.

The present invention overcomes these shortcomings by providing a system having a plurality of interconnected grotubes. Each grotube includes a main body or tube with a plurality of ports for attaching functional components. Of course, a grotube may be one main tube and one port or grow station. These functional components allow the sprouting and nurturing of seedlings; height control of the hydroponics medium or fluid in the grotube; allow better sealing of the tubes; allow nutrient addition from below or above the plant root system; allow connections between the tubes; provide removable planter baskets or strainers that use no or lesser amounts of ROCKWOOL slabs or growing blocks and solid growth supports such as clay pellets; and provide sealing plates that reduce the exchange of moisture out of or into the hydroponics system. The grotube and functional components are constructed of readily obtainable materials typically PVC or food grade PVC.

BRIEF DESCRIPTION OF THE DRAWINGS

The present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Various aspects of the illustrative embodiments will be described using terms commonly employed by those skilled in the art to convey the substance of their work to others skilled in the art. However, it will be apparent to those skilled in the art that the present invention may be practiced with only some of the described aspects. For purposes of explanation specific numbers, materials and configurations are set forth in order to provide a thorough understanding of the illustrative embodiments. However, it will be apparent to one skilled in the art that the present invention may be practiced without the specific details. In other instances, well-known features are omitted or simplified in order not to obscure the illustrative embodiments.

Various operations will be described as multiple discrete operations, in turn, in a manner that is most helpful in understanding the present invention, however, the order of description should not be construed as to imply that these operations are necessarily order dependent. In particular, these operations need not be performed in the order of presentation.

The phrase "one embodiment" is used repeatedly. The phrase generally does not refer to the same embodiment, however, it may. The terms "comprising", "having" and "including" are synonymous, unless the context dictates otherwise.

A feature list is provided below to assist in understanding the drawings while reviewing the present invention. It is understood that like features are like numbered throughout the drawings.

Figure 1:
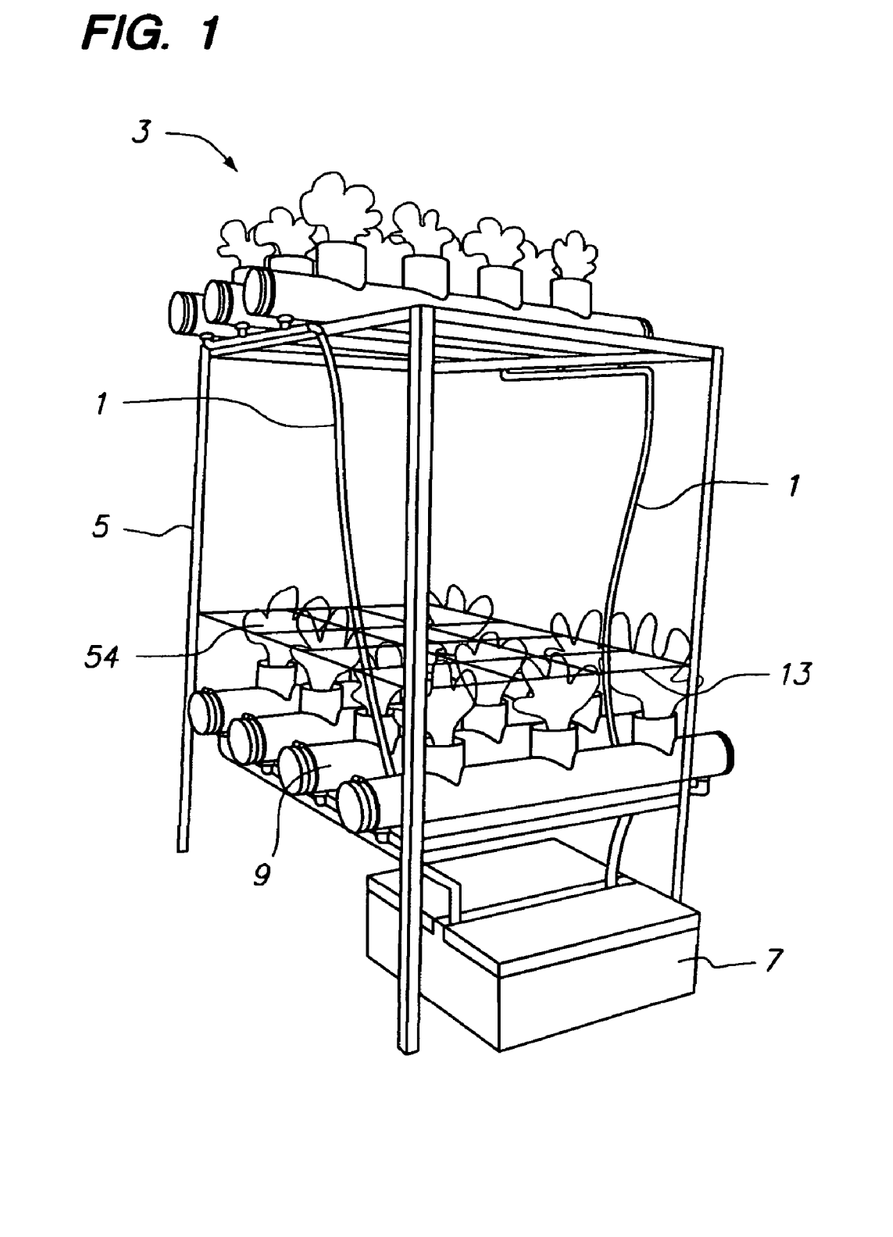
FIG. 1 illustrates a drawing of a hydroponics system with grotubes, in accordance with one embodiment of the present invention.

Referring now to FIG. 1, as in one embodiment, a hydroponics system 3 is shown. A plurality of grotubes 9 are provided that may be configured with four grotubes 9 positioned below three other grotubes 9 on a stand 5. A tank 7 may be used to supply and return fluid to both lower and upper grotubes 9 through lines 1. Support string 13 may be tied to the stand 5 to hold up a plant 54 as it grows.

Figure 2A:
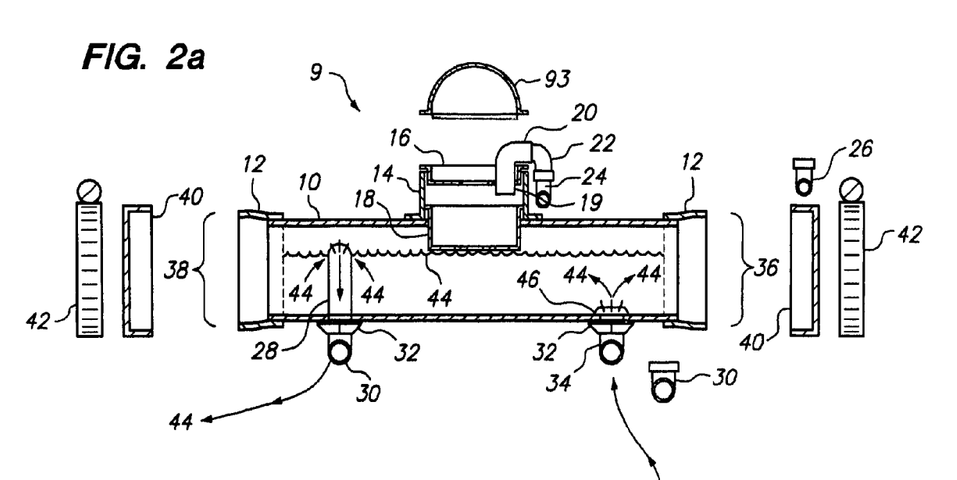
FIG. 2a illustrates a drawing of a sectional, side view of a grotube, in accordance with one embodiment of the present invention.

FIG. 2a, as in one embodiment, a grotube 9 in sectional side view is shown. Shown is main body 10 of the grotube. Illustrated are couplers 12 that may be configured for serial connection of a plurality of grotubes to form a linear grotube assembly. Many grotubes may be connected in parallel or a single grotube may be used alone. Finally, both combinations of serial and parallel connected grotubes can be assembled to make an arrangement of grotubes.

Further illustrated in FIG. 2a are inflow 36 and outflow 38 ends of the grotube used with couplers 12 to assemble more then one grotube together in series or in parallel. End caps 40 and straps 42 can be attached to main body 10 to seal inflow and outflow ends to provide a grotube alone. In this embodiment of the grotube end caps 40 and straps 42 replace coupler 12.

In FIG. 2a, arrows show the direction of flow of fluid 44 through the grotube. This fluid 44 is a hydroponics medium that provides nutrients for plant growth. The inside of the main body 10 may have clay pellets disposed throughout to help create more surface area for roots to grow. In one embodiment of the grotube fluid 44 flows from the inflow end 36 via tee 34 through fill plug 46 and exits the outflow end 38 via drain pipe 28, and finally another tee 34. Drain pipe 28 maintains the fluid at a predetermined level, approximately equal to the distance from the interior lower surface of main body or main body 10 to the top surface of drain pipe 28. This predetermined level makes sure the fluid is touching strainer 18 at the bottom. The height of drain pipe 28 may be changed to adjust the fluid level height in the grotube. Also the strainer 18 can be different depths to work in conjunction with drain pipe 28 to maintain the fluid level connect between these two parts.

Figure 2B:
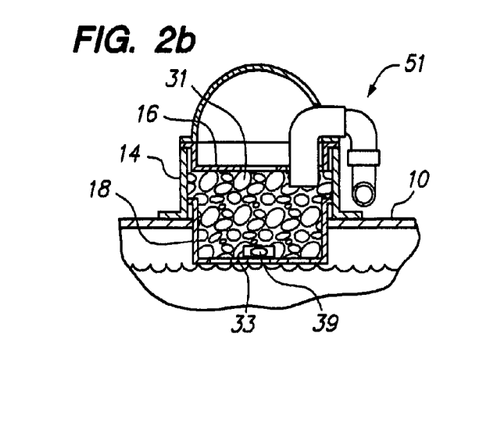
FIG. 2b illustrates a drawing of a sectional, side view of a grotube with a seed inside a grow block surrounded by clay pellets, in accordance with one embodiment of the present invention.

In FIG. 2a, as in one embodiment, shown is a saddle 14, plate 16, strainer 18, left elbow 20, dripper cap elbow 22, small tee 24, and alternate connector small elbow 26. The grotube may use a tee 34 which allows for the parallel interconnection of grotubes. When tee 34 is replaced by elbow 30 the grotube can be used singly or as the end unit of an interconnected group of grotubes. Left elbow 20, dripper cap elbow 22, small tee 24, and alternate connector small elbow 26 are all part of a dripper system or dripper 51 to provide hydroponics fluid from above the root ball as shown is FIG. 2b. Also illustrated in FIG. 2b are a drain pipe 28, elbow 30, flange 32, and tee 34. In one embodiment of the grotube, tee 34, which allows for parallel interconnection of grotubes, is alternatively replaced by elbow 30.

Figure 4:
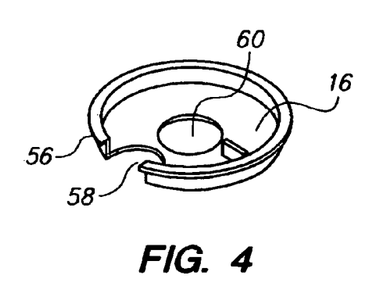
FIG. 4 illustrates a drawing of a plate for sealing that reduces moisture exchange between the interior and exterior of the grotube.
Figure 5:
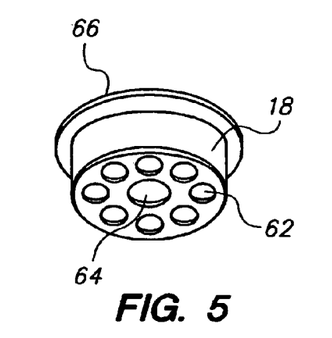
FIG. 5 illustrates a drawing of a strainer which is used as a root basket or plant root ball holder, in accordance with one embodiment of the present invention.

In FIG. 2b as in one embodiment shown are clay pellets 31 inside the saddle 14 on top of strainer 18 with plate 16 covering the clay pellets 31. Dripper 51 is used for fluid supply from above the growing block 33. A cutting or seed 39 is placed in a growing block 33 and then is placed on the strainer 18. Clay pellets 31 may surround the growing block 33. The goal is to nourish the growing block 33 containing the seed or cutting 39 to produce a root ball that will eventually have roots hanging into the pool of hydroponics fluid inside main body 10 by way of strainer holes 62 or growth port 60. Strainer holes 62 and growth port 60 are shown in FIGS. 5 and 4, respectively.

Figure 3A:
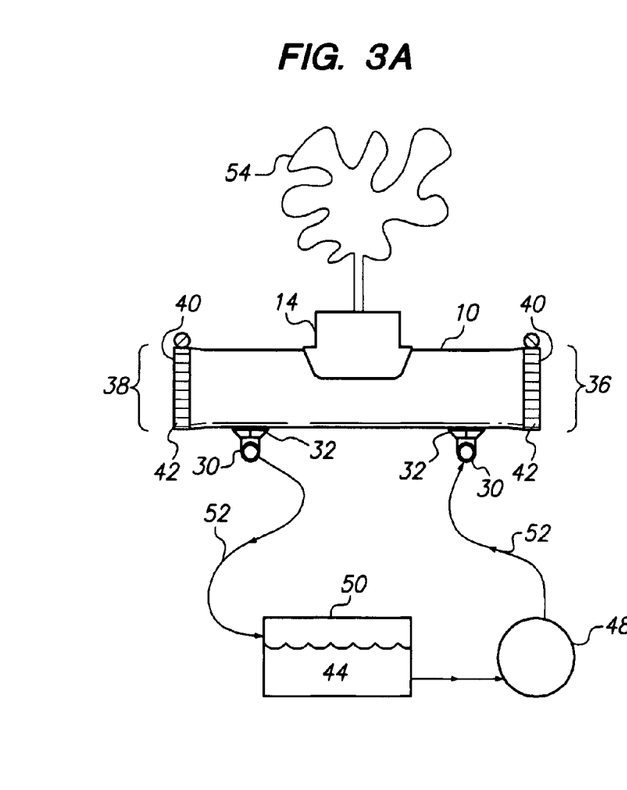
FIG. 3A illustrates a drawing of one embodiment of a grotube including the "ebb and flow" mode of hydroponics fluid contact with a plant root ball.

FIG. 3A illustrates one embodiment of a grotube including components the whole of which comprises a complete device. In this embodiment, one grotube is individually connected to pump 48 and reservoir 50 via tubing 52. Fluid 44 flows through the interconnected system in a counter-clockwise direction, from pump 48 via elbow 30 and fill plug 46 inside the grotube, into the grotube, exiting via drain plug or drain pipe 28 that is inside the grotube and second elbow 30 then exiting via second elbow 30. Flow continues into reservoir 44 and hence to the inlet side of pump 48. In this embodiment the inlet and outlet sides of main body 10 are sealed by end caps 40 and straps 42 so that fluid 44 is contained only in one grotube.

Shown in FIG. 3A is plant 54. This embodiment of the grotube illustrates the "ebb and flow" method of hydroponics nourishment, in which hydroponics fluid 44 is supplied from below the plant, contacting the roots or root ball of the plant without contacting the upper surfaces of the plant.

Figure 3B:
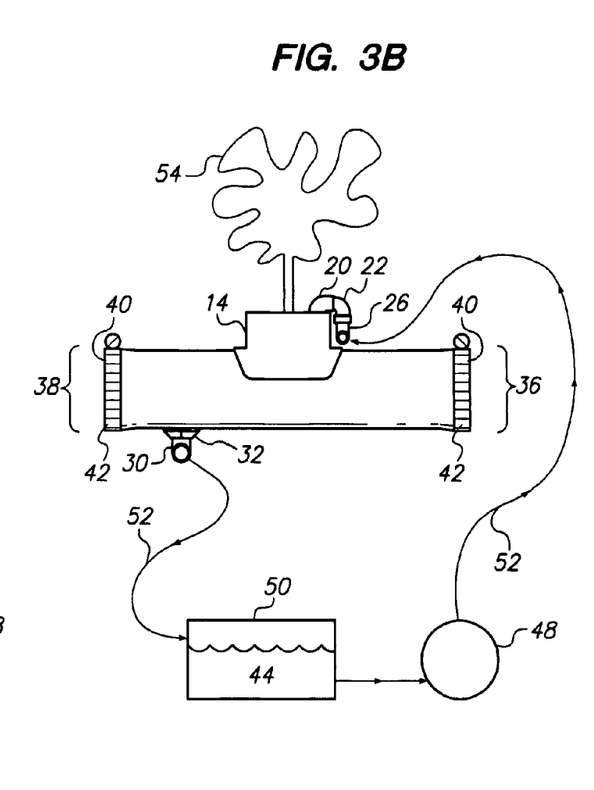
FIG. 3B illustrates a drawing of one embodiment of a grotube including a dripper to allow hydroponics fluid to contact the plant root ball from above.

FIG. 3B illustrates one embodiment of a grotube including components the whole of which is a complete device. In this embodiment, one grotube is individually connected to pump 48 and reservoir 50 via tubing 52. Fluid 44 flows through the interconnected system in a counter-clockwise direction, from pump 48 via small elbow 26, through dripper cap elbow 22, through left elbow 20, onto the roots of plant 54, and finally into the grotube, exiting via elbow 30. Flow continues into reservoir 44 and hence to the inlet side of pump 48. In this embodiment the inlet and outlet sides of main body 10 are also sealed by end caps 40 and straps 42 so that fluid 44 is contained in main body 10. This embodiment of the grotube illustrates the "drip" method of hydroponics nourishment, in which hydroponics fluid 44 is supplied from above plant 54, contacting the roots of the plant from above. Both the "ebb and flow" method of hydroponics nourishment and the "drip" method of hydroponics nourishment can exist in the same grotube at the same time.

Figure 6:
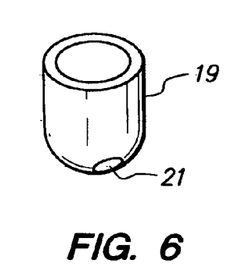
FIG. 6 illustrates a dripper cap with a dripper hole which is placed in the grotube to provide a supply of hydroponics fluid from above, in accordance with one embodiment of the present invention.
Figure 7:
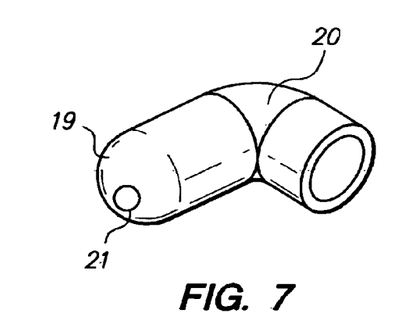
FIG. 7 illustrates a drawing of a connecting left elbow with dripper cap of the dripper system that is placed on the grotube and is typically connected to the connecting right elbow to provide a supply of hydroponics fluid from above, in accordance with one embodiment of the present invention.
Figure 8:
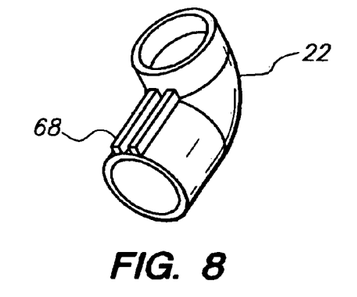
FIG. 8 illustrates a drawing of a dripper cap elbow, in accordance with one embodiment of the present invention.
Figure 9:
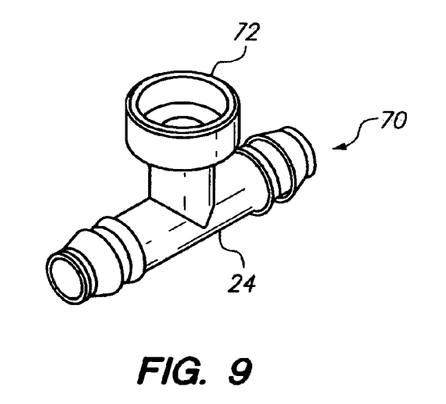
FIG. 9 illustrates a drawing of a connecting small tee, in accordance with one embodiment of the present invention.
Figure 10:
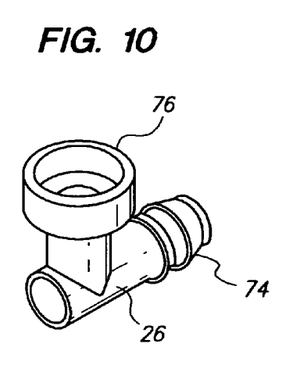
FIG. 10 illustrates a drawing of a connecting small elbow, in accordance with one embodiment of the present invention.

FIG. 4 illustrates plate 16. FIG. 5 illustrates strainer 18. Strainer 18 holds plant 54 and optionally solid growth media that provide additional support and nutrition for plant 54. FIG. 6 illustrates dripper cap 19 with dipper hole 21. Dripper cap 14 may be at least one quarter inch in diameter to avoid the dripper cap and dripper hole 21 from clogging especially from algae build up after use. FIGS. 6, 7, and 8 respectively illustrate dripper cap 19, dripper cap 19 connected to left elbow 20 and may be connected to dripper cap elbow 22. These together make up the dripper 51. FIG. 7 has left elbow 20 connected to dripper cap 19 and dripper cap 19 has dripper hole 21. FIG. 10 shows small elbow 26. Dripper cap elbow 22 may join with left elbow 20 to form an over all "U" shaped assembly; left elbow 20 is inserted through plate 16 via left elbow port 58 and left elbow 20 with dripper hole 21 provides the hydroponics fluid nourishment from above. Dripper cap elbow 22 has channel 68 that will slide over rib 25 to hold the dripper 51 in position. Small tee 24, illustrated in FIG. 9, attaches to the bottom of a right elbow. Upon growth, plant 54 protrudes through growth port 60 in plate 16.

In one embodiment, tubing 52 may be attached to small tee 24, and a grotube may be used in the "drip mode". In this embodiment, small tee 24 is also connected in parallel to other grotube and fluid flows downward onto the plant root system from left elbow 20 after passing through dripper cap elbow 22. Fluid then continues into main body 10. FIG. 10 as in one embodiment, instead of small tee 24, small elbow 26 is attached to the right elbow, the right elbow may attach to dripper cap elbow 22 or left elbow 20. Rather than operating in parallel with another grotube this allows for the operation of a single grotube.

Figure 11:
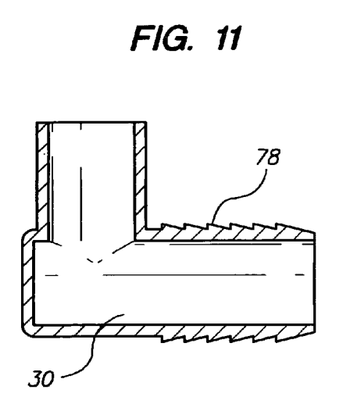
FIG. 11 illustrates a cross sectional drawing of an elbow, in accordance with one embodiment of the present invention.
Figure 12:
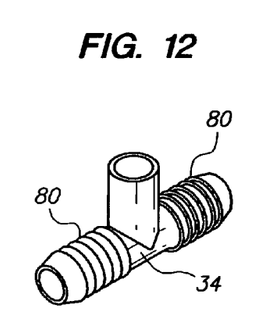
FIG. 12 illustrates a drawing of a connecting tee, in accordance with one embodiment of the present invention.

FIG. 11 is a cross sectional illustration of elbow 30 which has elbow hose barbs 78. The hose barbs form a rugged connection with tubing 52. Elbow 30 forms an outflow connector from pipe 10 that allows return of fluid 44 to reservoir 50 through tubing 52. FIG. 12 illustrates tee 34 with tee hose barbs 80.

Figure 13:
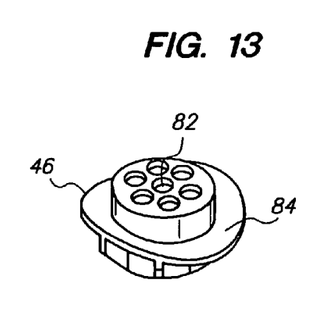
FIG. 13 illustrates a drawing of a fill plug, in accordance with one embodiment of the present invention.

FIG. 13 illustrates fill plug 46. Fill flange 84 of fill plug 46 abuts the lower surface of main body 10 flange 32 at inflow end 36. Fluid flows upward through fill holes 82. The fill holes 82 are shaped and arranged to avoid clogging that may happen from the clay pellet particles or other debris. However the design of having the shorter fill plug 46 supply the fluid causes a flushing action at fill holes 82 that substantially avoids clogging.

Figure 14:
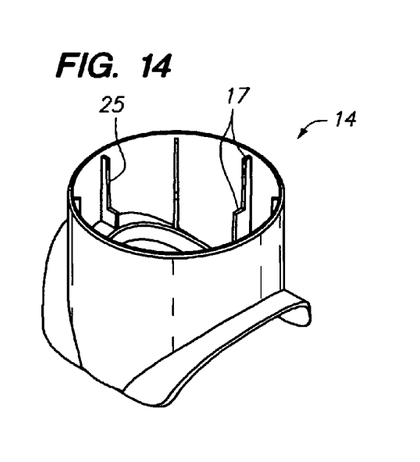
FIG. 14 illustrates a drawing of a saddle or plant site saddle, in accordance with one embodiment of the present invention.

FIG. 14 as in one embodiment shows the saddle 14 with integral shelves 17 for the plate 16 and strainer 18 to rest on. Rib 25 will allow the channel 68 to slide onto rib 25 to hold into a particular position dipper 51. Plate 16 is above strainer 18, both of which are supported on and in saddle 14; plate 16 and strainer 18 rest on rims 56 and 66 inside saddle 14 on integral shelves 17 in saddle 14. Plate 16 provides a partial seal that substantially prevents water vapor from escaping from the grotube. Plate 16 also partially prevents rain water from accumulating in the grotube. Plate 16 and strainer 18 are both removable from saddle 14.

Figure 15:
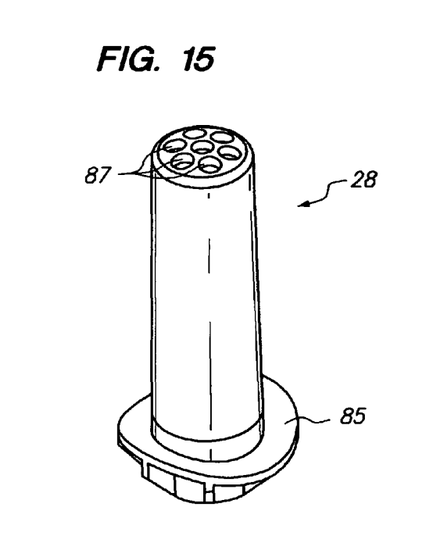
FIG. 15 illustrates a drawing of a drain plug or drain pipe, in accordance with one embodiment of the present invention.

FIG. 15 illustrates drain plug 28. Drain flange 85 of drain plug 28 abuts the lower surface of main body 10 at outflow end 38. Fluid flows out of grotube 9 through drain holes 87 the drain holes 87 are shaped and arranged to avoid clogging that may happen from the clay pellet particles or other debris. Small tee connectors 24 are used to attach grotubes in parallel for the purpose of supplying fluid from above in "drip mode". Similarly, tees 34, are used to attach grotubes in parallel for the purpose of supplying fluid from below in "ebb and flow" mode.

Figure 16:
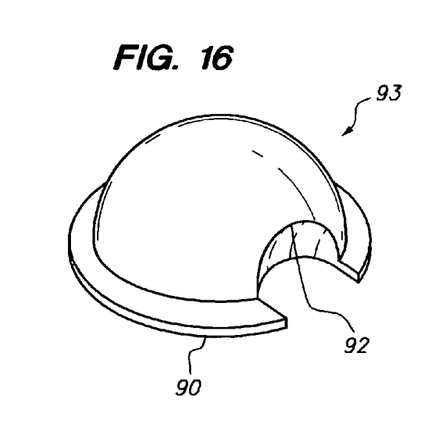
FIG. 16 illustrates a clone dome, in accordance with one embodiment of the present invention.

FIG. 16 illustrates dome 93 with cut out 92 and lip 90. Dome 93 attaches atop saddle 14 to provide additional resistance to water loss and create more humid or controlled environments for growing. Cut out 92 allows access by dripper cap 19 and elbow 20 to the plant or seed situated on strainer 18. Dome 93 may be used when sprouting of seeds or cuttings.

In one embodiment of the invention the material used for construction is food-grade polyvinylchloride (PVC) plastic; in this case the main body 10 and is preferably 4" in diameter. But it is understood that other plastics as well as such materials as copper and bronze or combinations thereof can be used for constructing all parts of a grotube and its components. Other materials, including colored, opaque, transparent, or translucent materials of other diameters and sizes can be used in any combination for construction. The use of opaque materials will inhibit algae growth in a grotube system.

While the present invention has been related in terms of the foregoing embodiments, those skilled in the art will recognize that the invention is not limited to the embodiments depicted. The present invention can be practiced with modification and alteration within the spirit and scope of the appended claims. Thus, the description is to be regarded as illustrative instead of restrictive on the present invention.

I claim:

1. An apparatus comprising:
    a tubular main body defined by an inside surface, an outside surface, a bottom wall portion, a top wall portion, a first end, a second end, an outlet formed in the bottom wall portion, a first inlet formed in the bottom wall portion, and a plurality of ports formed in the top wall portion;
    a saddle coupled to each port for supporting a plant;
    a plate supported by the saddle and having a dripper inlet and a growth port formed therein;
    a dripper assembly extending through the dripper inlet, said dripper assembly includes a dripper cap with a dipper hole, a left elbow connected to said dripper cap, and a dripper cap elbow connected to said dripper cap elbow;
    a pump for supplying a fluid to both the first inlet and the second inlet portion and receiving the fluid from the outlet; and
    a strainer having a lower portion containing a plurality of strainer apertures formed therein and interposed within each saddle and each port for supporting a rootball of the plant;
    wherein the rootball selectively includes a plurality of roots extending therefrom and interposed through the strainer apertures such that at least a portion of the roots may contact the fluid contained within the main body, the growth port permits the plant to extend upwardly therethrough.

2. The apparatus of claim 1, wherein the second inlet portion releases the fluid above the rootball.

3. The apparatus of claim 1, wherein the first inlet supplies the fluid to the main body below the rootball.

4. The apparatus of claim 1, wherein the outlet is interposed between the first end and the second end.

5. The apparatus of claim 1, wherein the first inlet is interposed between the first end and the second end.

6. The apparatus of claim 1, further comprising a plurality of interconnecting lines for supplying the fluid to the first inlet and receiving water from the outlet, wherein the interconnecting lines are connected to a plurality of main bodies.

7. The apparatus of claim 1, further comprising a tank for receiving the fluid from the outlet and transferring the fluid to the pump.

8. The apparatus of claim 1, further comprising a growing media container within the saddle above the strainer lower portion and below the plate.

9. The apparatus of claim 8, further comprising a grow block positioned within the growing media for supporting one of a seed or a cutting, wherein the growing media includes one of clay pellets or ROCKWOOL.

10. The apparatus of claim 1, wherein the outlet includes a drain pipe portion extending therethrough, wherein the drain pipe portion includes a plurality of drain apertures, such that the installed distance of the drain apertures above the bottom wall portion of the main body creates a fluid depth, and wherein the fluid depth is below the strainer apertures.

11. An apparatus comprising:
    a tubular main body defined by an inside surface, an outside surface, a bottom wall portion, a top wall portion, a first end, a second end, an outlet formed in the bottom wall portion, a first inlet formed in the bottom wall portion, and a plurality of ports formed in the top wall portion;
    a saddle coupled to each port for supporting a plant;
    a plate supported by the saddle and having a dripper inlet and a growth port formed therein a dripper assembly extending through the dripper inlet, said dripper assembly includes a dripper cap with a dipper hole, a left elbow connected to said dripper cap, and a dripper cap elbow connected to said dripper cap elbow;

a pump for supplying a fluid to both the first inlet and the second inlet portion and receiving the fluid from the outlet;

a strainer having a lower portion containing a plurality of strainer apertures formed therein and interposed within each saddle and each port for supporting a rootball of the plant; and wherein the outlet includes a drain pipe portion extending therethrough, wherein the drain pipe portion includes a plurality of drain apertures, such that the installed distance of the drain apertures above the bottom wall portion of the main body creates a fluid depth, and wherein the fluid depth is below the strainer apertures;

wherein the rootball selectively includes a plurality of roots extending therefrom and interposed through the strainer apertures such that at least a portion of the roots may contact the fluid contained within the main body, the growth port permits the plant to extend upwardly therethrough.

12. The apparatus of claim 11, further comprising a second inlet portion extending through the dripper inlet.

13. The apparatus of claim 12, wherein the second inlet portion releases the fluid above the rootball.

14. The apparatus of claim 11, wherein the first inlet supplies the fluid to the main body below the rootball.

15. The apparatus of claim 11, wherein the outlet is interposed between the first end and the second end.

16. The apparatus of claim 11, further comprising a plurality of interconnecting lines for supplying the fluid to the first inlet and receiving water from the outlet, and at least one tee for connecting a plurality of main bodies in parallel.

17. The apparatus of claim 11, further comprising a growing media container within the saddle above the strainer lower portion and below the plate.

18. The apparatus of claim 17, further comprising a grow block positioned within the growing media for supporting one of a seed or a cutting, wherein the growing media includes one of clay pellets or ROCKWOOL.

19. The apparatus of claim 11, wherein the outlet includes a drain pipe portion extending therethrough, wherein the drain pipe portion includes a plurality of drain apertures, such that the installed distance of the drain apertures above the bottom wall portion of the main body creates a fluid depth, and wherein the fluid depth is below the strainer apertures.

* * * * *